United States Patent [19]

Evans

[11] Patent Number: 5,611,255

[45] Date of Patent: Mar. 18, 1997

[54] FOOD FILM CUTTER ASSEMBLY

[75] Inventor: David J. Evans, Haymarket, Va.

[73] Assignee: Marketing & Distribution Services, Inc., Browns Summit, N.C.

[21] Appl. No.: 441,087

[22] Filed: May 15, 1995

[51] Int. Cl.$^6$ ...................................................... B26D 1/04
[52] U.S. Cl. .................. 83/614; 83/649; 83/658; 83/949; 83/955
[58] Field of Search .............................. 83/614, 954, 955, 83/658, 659, 346, 347, 455, 823; 225/48, 53, 43

[56] References Cited

U.S. PATENT DOCUMENTS

| | | | |
|---|---|---|---|
| 707,294 | 8/1902 | Blackhall | 83/658 |
| 3,142,217 | 7/1964 | Busse | 83/614 |
| 3,848,501 | 11/1974 | Kuts | 83/508 |
| 4,069,729 | 1/1978 | Kuts | 83/596 |
| 4,194,267 | 3/1980 | Johnson et al. | 83/367 |
| 4,906,145 | 3/1990 | Oliver | 83/955 |
| 5,322,201 | 6/1994 | Garr | 225/53 |
| 5,408,909 | 4/1995 | Suk | 83/614 |

OTHER PUBLICATIONS

Deluxe Ribbon Dispenser/Cutter brochure (undated) (prior to May 95).

*Primary Examiner*—Kenneth E. Peterson
*Assistant Examiner*—Sean A. Pryor

[57] ABSTRACT

A cutter assembly for food film includes a rigid planar base with a movable metal strip anvil movably positioned thereon. A slidable cutter arm for forward or rearward movement is attached to a rear axle affixed to the base. The assembly, in one embodiment, can be positioned atop a conventional box of rolled food film. Safe, manual cutting of the food film to convenient lengths can be easily accomplished with minimal training and effort. A turret blade allows for convenient blade changing when dulling occurs.

16 Claims, 2 Drawing Sheets

FOOD FILM CUTTER ASSEMBLY

BACKGROUND OF THE INVENTION

1. Field of the Invention

A manual cutter assembly is provided for cutting thin films or foils as are used to cover food articles in homes and restaurants. A slidable cutter arm with a mounted cutting wheel is attached to a planar base above a strip anvil which is movably attached to the base. By manually directing the arm laterally across the film placed on the anvil, the wheel revolves and cleanly severs the film in a single stroke.

2. Description of the Prior Art and Objectives of the Invention

Thin "poly" films have become increasingly popular in recent years for protecting food and other articles. Such films are necessary since many food products are microwaved and metallic foils are not suitable for such purposes. Poly films consist of vinyl, polyethylene, or other monomers or polymers, and are sold under a variety of trademarks for home and commercial uses. Generally, manufacturers of poly and other type films and foils provide a metallic blade with a serrated edge with the box containing the film roll for cutting sheets from the roll of desired length. In restaurants and other food preparation areas, these serrated blades often become bent or dull, and are often difficult for inexperienced kitchen workers or food handlers to effectively use. To employ, the film must be lifted past the sharp edges of the serrated blades, and as a result, nicks and cuts on the hands of the users are common, often requiring minor medical treatment before the worker can continue. Such nicks and cuts can cause unsanitary conditions and the possible spread of viruses and diseases, a safety concern of responsible food handlers.

Thus, with the known disadvantages and problems associated with conventional food film and metallic foil cutting devices, the present invention was conceived and one of its objectives is to provide a food film cutter assembly which is safe for the user.

It is another objective of the present invention to provide a food film cutter assembly which has no dangerous exposed cutting edges or blades.

It is yet another objective of the present invention to provide a food film cutter assembly which can be used to accurately cut food films and foils which remain in place for easy access.

It is still another objective of the present invention to provide a food film cutter assembly in which the blade can be easily changed when it becomes dull.

It is also another objective of the present invention to provide a food film cutter assembly which is relatively inexpensive to purchase and which is durable over a prolonged time.

Various other objectives and advantages of the inventor will become apparent to those skilled in the art as a more detailed description is set forth below.

SUMMARY OF THE INVENTION

A food film cutter assembly is provided which, in one embodiment, is affixed to the top of a standard food film box having a slotted top for withdrawal of the food film. A planar base supports a cylindrically shaped axle on which a cutter arm is rotatably, slidably positioned. This cutter arm extends forward across the planar base and in its proximal end a blade is mounted. Immediately below the blade of the cutter arm, a movable strip anvil is positioned on the planar base. Movement of the anvil prevents the formation of grooves by the cutter arm blade after multiple cutting cycles. In another embodiment of the invention a stand is provided for use with larger rolls of plastic film or metallic foil, for example, for use in institutional dining facilities, commercial restaurants, or the like.

DETAILED DESCRIPTION OF THE PREFERRED EMBODIMENT

Figure 1:
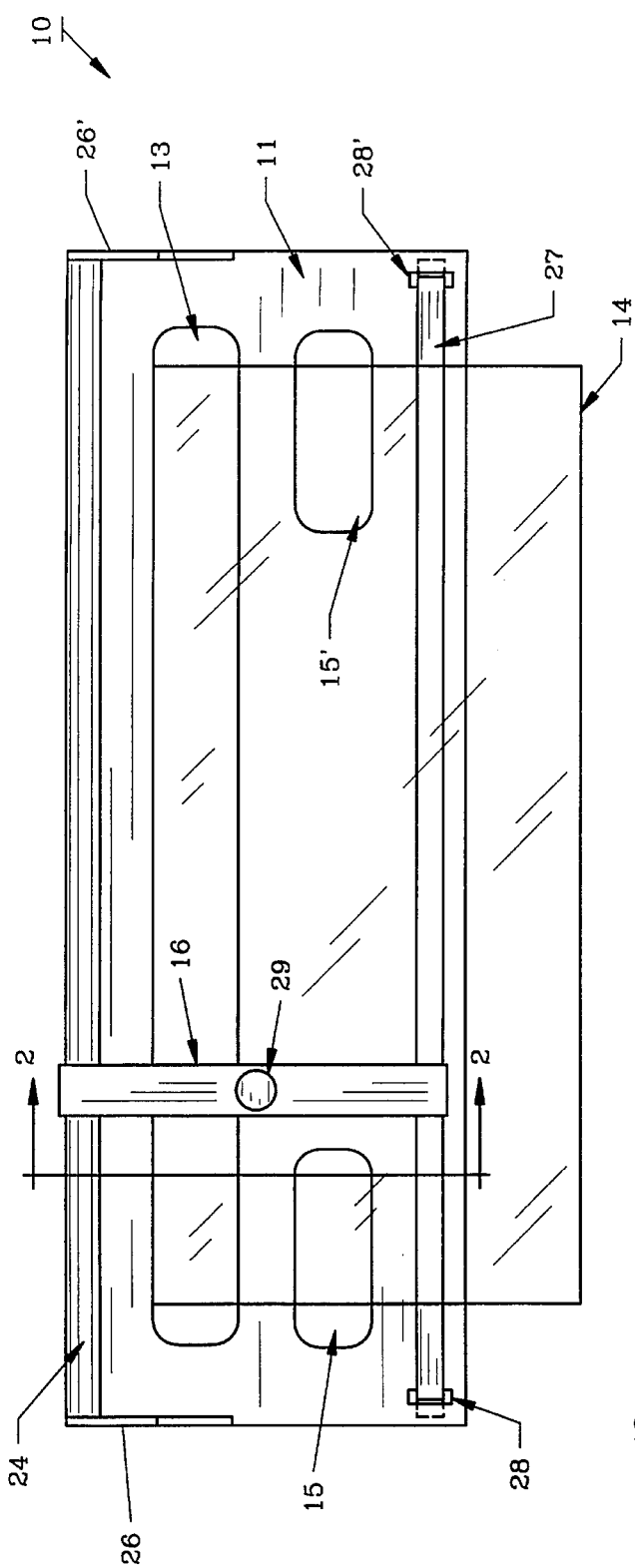
FIG. 1 shows a top view of the food film cutter assembly of the invention with a transparent film from a box below passing therethrough.
Figure 2:
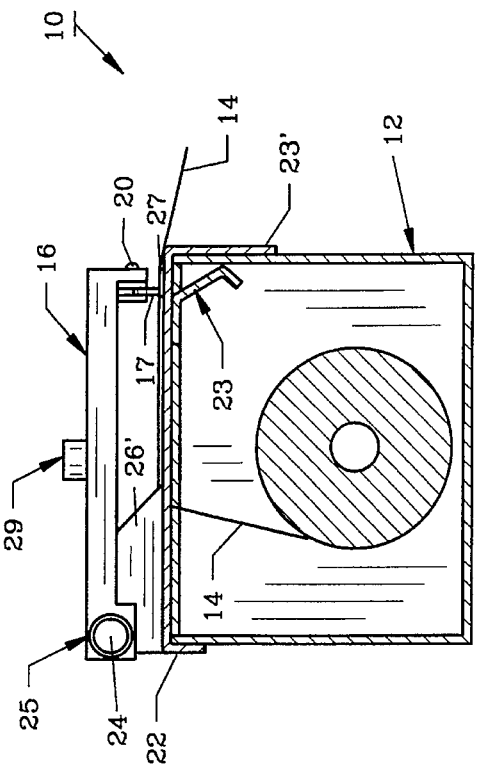
FIG. 2 illustrates a side view of the cutter assembly shown in FIG. 1 on lines 2—2 of FIG. 1.
Figure 3:
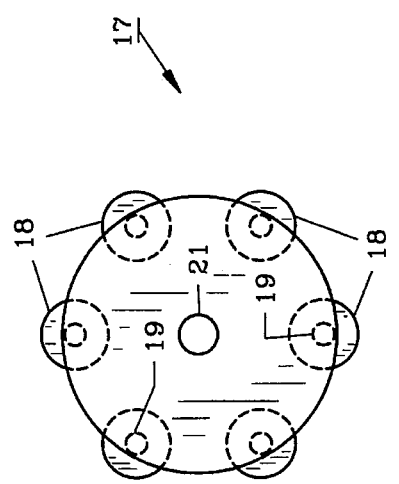
FIG. 3 demonstrates an enlarged front view of the turret cutter blade as used in the embodiments pictured in FIGS. 1 and 2.

The preferred form of the invention is shown in FIGS. 1, 2, and 3 whereby the cutter assembly includes a planar base above which a cutter arm axle is mounted for supporting a slidable cutter arm. The planar base may be formed of sheet metal of suitable thickness to provide an affinity for poly films, and the cutter arm and cutter arm axle are formed from a lightweight but strong plastic such as Delcon, (a trademark). Positioned at the proximal or front end of planar base 11 is a stainless steel strip anvil which is positioned within oversized side openings to allow movement therein. A turret type blade as shown in FIG. 3 allows one of six cutting wheels to be selected and changed when dull. Positioned centrally of the cutting arm is a cutter arm knob to allow sure, swift manual strokes of the arm during cutting. The planar base of the cutter assembly defines a pair of finger openings for easy lifting and unrolling of the poly film across the anvil for a desired film length.

DETAILED DESCRIPTION OF THE DRAWINGS AND OPERATION OF THE INVENTION

For a better understanding of the invention and its operation, turning now to the drawings, FIG. 1 shows a top view of food film cutter assembly 10 having a planar rigid base 11 which may be formed from aluminum, steel, plastic, or other suitable materials. Planar base 11 is designed to fit over a standard food poly film box such as 12, shown in FIG. 2. Planar base 11 includes an elongated opening 13 through which food film 14 can easily pass from film box 12 therebelow. Food film 14 is generally a transparent polymeric flexible film as conventionally used in the food industry and may also be a vinyl, acrylic, metal foil or one of the many other "poly" films sold under various trademarks. Such food films are packaged in various roll diameters and length boxes. Food film cutter assembly 10, as shown in FIG. 1, would accommodate a standard 12 or 15 inch roll. However, food cutter assembly 10 could be manufactured for other width rolls as required. Food film 14 may also come in a variety of thicknesses (mils) and cutter assembly 10 will easily cut such usual variations.

Finger openings 15, 15' on planar base 11 are shown in FIG. 1 along the side of film 14 and are useful in manually gripping film 14 for convenience in pulling it forward, out of box 12, seen in FIG. 2, to a desired length. In order to cut film 14, cutter arm 16 includes a cutter blade 17 shown in FIG. 2 which is affixed to cutter arm 16. An enlarged view of turret cutter blade 17 having a series of six (6) rotatable cutting wheels 18 is seen in FIG. 3. Cutting wheels 18 revolve around shafts 19 and turret cutter blade 17 is releasably affixed by threaded member 20 as shown in FIG. 2 which holds turret blade 17 to cutter arm 16. If a particular cutting wheel 18 dulls, threaded member 20 is loosened with a screwdriver, turret blade 17 rotated 90 degrees, and a new, sharper cutting wheel 18 is then ready to cut. Threaded member 20 passes through aperture 21 on turret cutter blade 17 for attachment to cutter arm 16.

As further shown in FIG. 1, cutter arm 16 is slidably positioned on cutter arm axle 24 which extends substantially the length of planar base 11. Axle 24 passes through cutter arm axle opening 25 (FIG. 2) at the distal end of cutter arm 16. Cutter arm axle 24 is formed from a suitable material, such as a flexible plastic rod, which allows both support and flex for a smooth, even movement of arm 16 as it moves along planar base 11. Likewise, cutter arm 16 may be formed from a suitable plastic material and will rotate upwardly, from planar base 11 for sliding film 14 thereunder and for changing cutter blades 17. Cutter arm axle 24 is affixed in a posture above planar base 11 at each end by axle mounts 26, 26', as further seen in FIG. 1.

Cutter blade 17 severs film 14 as cutter arm 16 is manually moved along axle 24. Planar base 11 holds stainless steel strip anvil 27 which is "loosely" positioned beneath turret cutter blade 17. Anvil 27 has L-shaped ends which fit within slots 28, 28'. As shown in FIG. 1, anvil 27 is of a narrower width than slots 28, 28' to allow anvil 27 to move therein. The movement of anvil 27 prevents grooves being formed by blade 17 through constant contact along one position of anvil 27. Rather, the movement of anvil 27 decreases the possiblity of grooves being formed and prolongs the life and effectiveness of cutter assembly 10.

In use, cutter arm knob 29 which is attached approximately at the center of cutter arm 16 is firmly, manually gripped and with slight downward hand pressure, cutter arm 17 is directed transversely along film 14 positioned therebeneath on anvil 27 for a quick, clean severance of film 14. Film 14 can be pulled from box 12, through slot 13 and beyond anvil 27 to any desired length and numerous pieces of film can be cut as necessary for covering salads, meats, or other products.

In FIG. 2, planar base 11 is securely positioned on conventional food film box 12 by rear base lip 22, inner depending flange 23, and front flange 23'. Depending flange 23 is affixed to the underneath side of planar base 11 and is of length to accomodate the smallest size box utilized, for example a box containing a 12 inch wide food film roll.

Figure 4:
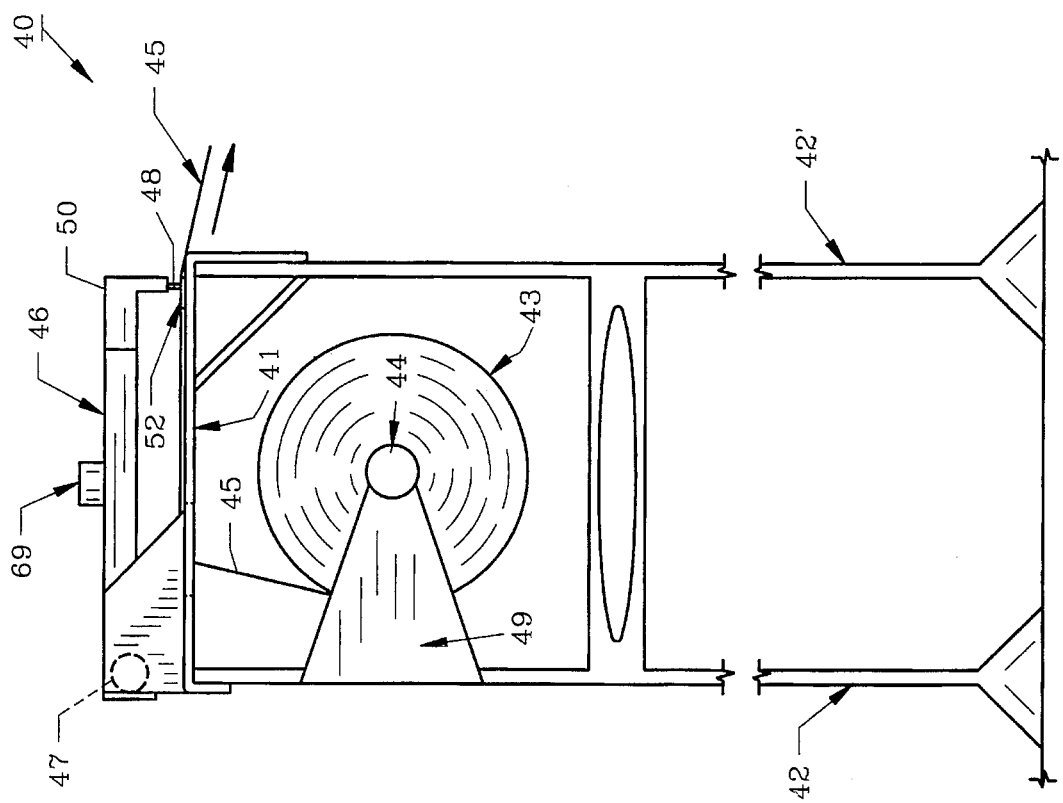
FIG. 4 depicts a second embodiment of the cutter assembly as used for commercial purposes.

In another embodiment, food film cutter assembly 40 is shown in a side view in FIG. 4, whereby planar base 41 is mounted on fragmented legs 42, 42'. As seen, food film cutter assembly 40 accommodates a large diameter film roll 43 by mandrel 44, rotatably joined to a pair of rear legs 42 affixed to mandrel supports 49 (only one shown). Legs 42, 42' are approximately 30 inches in length to accommodate a standing user. As earlier explained, film 45 is pulled forward from roll 43 to any desired length and as hereinbefore described, cutter arm 46 is directed along axle 47 with blade 48 in contact with film 45 which is atop anvil 52, to sever film 45. Knob 69 allows for easy, manual gripping and direction of cutter arm 46 during use in both directions.

Figure 6:
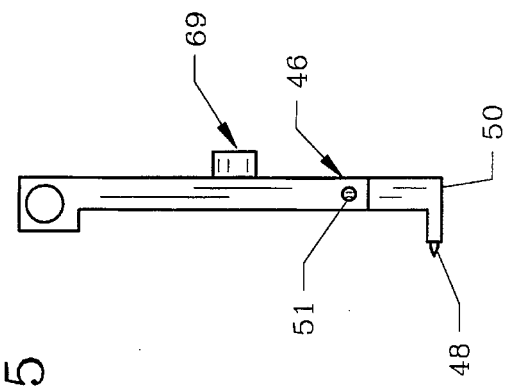
FIG. 6 presents a side view of the cutter arm as seen in FIG. 5.
Figure 5:
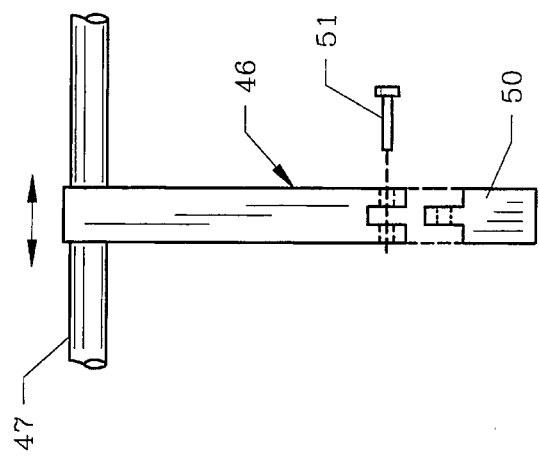
FIG. 5 pictures the cutter arm as removed from the assembly of FIG. 4.

Cutter arm 46 as shown in FIGS. 5 and 6 has a different blade configuration than blade 17 shown in FIGS. 1–3, as cutter arm 46 has a replaceable terminal tip 50 and a single, fixed cutting blade 48 which is attached to arm 46 by pin 51. Terminal tip 50 contains a single blade 48 as illustrated in FIG. 6 which is permanently mounted therein. When blade 48 dulls, tip 50 is removed by withdrawing pin 51 and a new terminal tip 50 with a new blade 48 is quickly and easily installed.

The illustrations and examples provided herein are merely for explanatory purposes and are not intended to limit the scope of the appended claims.

I claim:

1. A cutter assembly comprising: a planar base, said planar base defining a first slot and a second slot, a cutter arm, said arm slidably attached to said base, a rotatable cutting wheel, an anvil, said anvil positioned in said first slot and said second slot, said anvil slidable within said first slot and said second slot axially of said cutting wheel, said blade supported within said arm for cutting objects disposed between said base and said arm by sliding said arm along said base.

2. The cutter assembly of claim 1 wherein said base defines a film opening.

3. The cutter assembly of claim 1 wherein said base defines a finger opening.

4. The cutter assembly of claim 1 and including a cutter arm axle, said cutter arm axle attached to said base.

5. The cutter assembly of claim 4 wherein said cutter arm axle is attached above said base.

6. The cutter assembly of claim 4 wherein said cutter arm is slidably positioned on said cutter arm axle.

7. The cutter assembly of claim 1 and including a front depending flange, said front depending flange attached to said base.

8. The cutter assembly of claim 1 wherein said anvil is positioned beneath said cutting wheel.

9. The cutter assembly of claim 1 wherein said anvil has a width less than said first slot, whereby said anvil may slide therein axially of said cutting wheel.

10. A cutter assembly for severing a film comprising: a planar base, said base defining a film opening, said base defining a first slot and a second slot, an axle, said axle attached to said base, a rotatable cutter arm, said cutter arm positioned on said axle for slidable movement therealong, a cutter blade, said cutter blade attached to said cutter arm, an anvil, said anvil positioned in said first slot and said second slot beneath said cutter blade, whereby said anvil may slide axially of said cutter blade within said first slot and said second slot and film positioned through said film opening and onto said anvil can be severed by said cutter blade as said cutter arm is moved along said axle.

11. The cutter assembly of claim 10 wherein said cutter arm comprises a detachable tip.

12. The cutter assembly of claim 10 wherein said base defines a finger opening.

13. The cutter assembly of claim 10 wherein said cutter blade comprises a turret blade.

14. The cutter assembly of claim 10 wherein said axle is flexible.

15. A cutter assembly for severing a film comprising:
(a) a planar base for moving the film thereon, said planar base defining a first slot and a second slot;
(b) a blade axle, said blade axle attached laterally to said base;
(c) a blade, said blade positioned on said blade axle for slidable movement laterally to said base; and
(d) an anvil, said anvil slidably positioned beneath said blade and within the first slot and the second slot, whereby said anvil slides within the first slot and the second slot perpendicularly to said blade axle and parallel to said film movement.

16. The cutter assembly of claim 15 wherein said anvil has width less than the width of said first slot and said second slot.

* * * * *